United States Patent Office 3,629,399

Patented Dec. 21, 1971

1

2

3,629,399
STABLE POLIOMYELITIS VACCINES

Rudolf Mauler, Cappel, near Marburg an der Lahn, and Horst Gruschkau, Marbach, near Marburg an der Lahn, Germany, assignors to Behringwerke Aktiengesellschaft, Marburg an der Lahn, Germany

No Drawing. Filed Aug. 30, 1968, Ser. No. 756,387
Claims priority, application Germany, Sept. 5, 1967, P 16 17 356.1
**Int. Cl. A61r *27/00***
U.S. Cl. 424—89 3 Claims

ABSTRACT OF THE DISCLOSURE

Orally administrable poliomyelitis vaccine containing attenuated poliomyelitis virus is stabilized by the addition of a phosphate buffer having a pH from 4.5 to 7.0 at a concentration from 0.001 M to 3.0 M.

The present invention relates to an improved stable orally administrable poliomyelitis vaccine.

Attenuated poliomyelitis viruses are very unstable and can be stored only in the frozen state. When stored at the usual storage temperature of from 4° to 6° C., the oral poliomyelitis vaccines are, however, rapidly inactivated. Many attempts have, therefore, been made to prepare stable oral poliomyelitis vaccines that are stable at temperatures above 0° C. Thus, the attenuated poliomyelitis viruses have been mixed with ground non-hydrated gelatin and filled into capsules, or applied to sugar cores and dried, or mixed with peptones, or salts of bivalent cations or aluminum salts have been added thereto. Those methods, however, have not been successful in preventing the gradual decrease in activity of oral poliomyelitis vaccines at temperatures of from 4° to 6° C.

Another reason for the decrease in activity is that the attenuated poliomyelitis viruses are adsorbed from the solution onto the walls of glass containers. This adsorption is increased by shaking, for example during transport, and may inactivate the vaccine to a large extent within a very short time.

We have now found that, the manufacture of an orally administrable poliomyelitis vaccine can be improved and the above-described disadvantages can be avoided, by adding to attenuated poliomyelitis viruses obtained in known manner.

(a) phosphate buffer having a pH-value of from 4.5 to 7.0, preferably 6.7, in a molarity of from 0.001 to 3.0, preferably of 0.3 M, to which casein in a concentration of from 0.01 to 10.0, preferably 5.0%, or lactalbumin hydrolysate or casein hydrolysate in a concentration of from 0.6 to 10.0%, preferably 1.0%, relative to the total amount, is advantageously added, or (b) alkali metal ions, for example sodium or potassium ions, in a molarity between 0.2 M and the saturation concentration, preferably 2.0 M.

Preferred phosphate buffers are McIlvaine-buffer (disodium hydrogenphosphate/citric acid) or Sörensen-buffer (potassium dihydrogenphosphate/disodium hydrogenphosphate). Other phosphate-containing buffer systems, such as potassium dihydrogenphosphate/sodium hydroxide; disodium hydrogenphosphate/sodium dihydrogenphosphate as well as the buffers of Britton and Robinson, of Davies and of Teorell and Stenhagen are likewise useful.

The use of phosphate buffers or alkali metal ions increases the stability of the poliomyelitis vaccine at temperatures above 0° C. Moreover, the addition of casein, casein hydrolysate or lactalbumin hydrolysate prevents adsorption of the poliomyelitis viruses onto the walls of the vessel or may even reverse adsorption that has already taken place.

The following examples serve to illustrate the invention, but they are not intended to limit it thereto.

The experiments described in the examples were carried out using aqueous suspensions of live attenuated poliomyelitis viruses strain Sabin type I and mixtures of types I, II and III (trivalent vaccine). The experiments were evaluated by titration of the virus content in tissue culture tubes and indicated in $TCID_{50}$ (tissue culture infectivity dose 50%). For the evaluation dilution series having the factor 10 were prepared from the samples. As dilution medium TCM 199 (tissue culture medium 199) was used (Morgan, J. F., Morton, H. J., and Parker, R. C., 1950, nutrition of animal cells in tissue culture. I. Initial Studies on a Synthetic Medium. Proc. Soc. Exper. Biol. & Med. 73, 1–8.). Ten tubes were charged each with 1 milliliter of each dilution step, incubated at 35° C. and the results were evaluated on the seventh day. The virus titers were calculated according to Reed and Muench, Am. J. Hyg. 27, 493 (1938). In the shaking tests, the samples were shaken for 12 to 14 hours about 100 times per minute at an ambient temperature of from +4° to +6° C.

EXAMPLE 1

Trivalent oral poliomyelitis vaccines (types I, II and III) were combined with a phosphate buffer according to Sörensen (pH 6.7) up to a final concentration of 0.5 mol/liter; 1% of lactalbumin hydrolysate, 1% of casein hydrolysate and 5% of casein were added to each sample of this solution. All the samples were shaken together with a control sample for 12 hours at 4° to 6° C. by a mechanical device. Another control sample was left unshaken at the same temperature. After 12 hours, the following results were obtained:

| | Virus titer ($TCID_{50}$) | | |
|---|---|---|---|
| | Type I | Type II | Type III |
| Control sample not shaken | $2.5\times10^6$ | $8.0\times10^5$ | $1.6\times10^6$. |
| Control sample shaken | $0.2\times10^6$ adsorption 92% | $4.0\times10^5$ adsorption 50% | $0.4\times10^6$ adsorption 75%. |
| Phosphate buffer added, pH 6.7; 0.5 mol | $2.7\times10^6$ adsorption 0% | $8.2\times10^5$ adsorption 0% | $1.7\times10^6$ adsorption 0%. |
| Phosphate buffer (pH 6.7; 0.5 mol) and 1% of lactalbumin hydrolysate added | $2.6\times10^6$ adsorption 0% | $8.1\times10^5$ adsorption 0% | $1.6\times10^6$ adsorption 0%. |
| Phosphate buffer (pH 6.7; 0.5 mol) and 1% of casein hydrolysate added | $2.25\times10^6$ adsorption 10% | $7.6\times10^5$ adsorption 5% | $1.6\times10^6$ adsorption 0%. |
| Phosphate buffer (pH 6.7; 0.5 mol) and 5% of casein added | $2.4\times10^6$ adsorption 4% | $7.8\times10^5$ adsorption 2.5% | $1.5\times10^6$ adsorption 6%. |

The experiment showed that 92%, 50% and 75%, respectively, of the viruses were adsorbed on shaking but that adsorption was prevented to a large extent or even entirely when using the additives of the invention.

EXAMPLE 2

A trivalent oral poliomyelitis vaccine was prepared containing 1.0% of lactalbumin hydrolysate and 0.3 molar phosphate buffer having a pH of 6.7. Besides, an analogous trivalent oral poliomyelitis vaccine was prepared without using lactalbumin hydrolysate nor phosphate buffer. Both vaccines were stored for 6 months at 4° C. The virus content of both vaccines was determined at the beginning, after 3 months and after 6 months of storage.

VACCINES CONTAINING LACTALBUMIN HYDROLYSATE AND PHOSPHATE BUFFER

| | Virus titer ($TCID_{50}$) | | |
|---|---|---|---|
| | Type I | Type II | Type III |
| Initial value at the beginning of experiment | $2.5\times10^6$ | $8.2\times10^5$ | $1.5\times10^6$ |
| After 3 months | $2.6\times10^6$ | $8.1\times10^5$ | $1.5\times10^6$ |
| After 6 months | $2.55\times10^6$ | $8.25\times10^5$ | $1.5\times10^6$ |
| Loss after 6 months | | | |

VACCINES WITHOUT ADDITIVES

| | Virus titer ($TCID_{50}$) | | |
|---|---|---|---|
| | Type I | Type II | Type III |
| Initial value at the beginning of experiment | $2.4\times10^6$ | $8.2\times10^5$ | $1.5\times10^6$ |
| After 3 months | $1.1\times10^6$ | $2.5\times10^5$ | $4.0\times10^5$ |
| After 6 months | $1.2\times10^5$ | $8.0\times10^4$ | $8.0\times10^4$ |
| Loss after 6 months, percent | 80 | 89.8 | 81.2 |

This experiment demonstrated that a vaccine containing lactalbumin hydrolysate and phosphate buffer remained stable over the whole observation period of 6 months, whereas a vaccine without these additives had lost almost its whole activity.

EXAMPLE 3

Samples of an oral poliomyelitis virus of type I were combined with sodium chloride to reach a final concentration of 2 mols or with potassium chloride to reach a final concentration of 1.5 mols, they were shaken according to Example 1 and the virus content was determined prior to and after shaking.

| | Virus content in $TCID_{50}$ (type I) | | |
|---|---|---|---|
| Additives | Prior to shaking | After shaking | Losses |
| No additive (control) | $6.3\times10^5$ | $9.0\times10^4$ | About 84%. |
| 2 mols of NaCl | $6.4\times10^5$ | $6.0\times10^5$ | About 6%. |
| 1.5 mols of KCl | $6.4\times10^5$ | $3.9\times10^5$ | About 39%. |

This experiment demonstrated that an addition of salts of monovalent cations also considerably reduced the adsorption of the oral poliomyelitis virus to glass.

We claim:

1. An orally administrable poliomyelitis vaccine comprising an immunologically effective attenuated poliomyelitis virus stabilized by the presence of a therapeutically acceptable phosphate buffer having a pH from 4.5 to 7.0 added at a concentration from 0.001 M to 3.0 M.

2. A vaccine as in claim 1 additionally stabilized by the presence of a member selected from the group consisting of casein added at a concentration of 0.01 to 10.0 percent and a hydrolysate of casein or lactalbumin added at a concentration of 0.6 to 10.0 percent.

3. A vaccine as in claim 1 wherein said buffer is selected from the group consisting of $KH_2PO_4/NaOH$, $Na_2HPO_4/NaH_2PO_4$, and the buffers of McIlvaine, Sörensen, Britton-Robinson, Davies, and Teorell-Stenhagen.

References Cited

UNITED STATES PATENTS 2,399,443 4/1946 Masucci ............ 424—89
3,143,473 8/1964 Hennessen et al. ...... 424—89

OTHER REFERENCES

Chemical Abstracts, Vol. 54, entry 20097i, 1960.
Chemical Abstracts, Vol. 64, entry 10106g, 1966.

RICHARD L. HUFF, Primary Examiner